US008521500B2

(12) United States Patent
Arsovski et al.

(10) Patent No.: US 8,521,500 B2
(45) Date of Patent: Aug. 27, 2013

(54) METHOD AND DEVICE FOR MEASURING INTEGRATED CIRCUIT POWER SUPPLY NOISE AND CALIBRATION OF POWER SUPPLY NOISE ANALYSIS MODELS

(75) Inventors: Igor Arsovski, Williston, VT (US); Bruce Balch, Saranac, NY (US); Umberto Garofano, Essex Junction, VT (US); Nazmul Habib, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 12/862,310

(22) Filed: Aug. 24, 2010

(65) Prior Publication Data

US 2012/0049947 A1    Mar. 1, 2012

(51) Int. Cl.
*G06F 17/50* (2006.01)
(52) U.S. Cl.
USPC ............................................................. 703/14
(58) Field of Classification Search
USPC ................................................................ 703/14
See application file for complete search history.

(56) References Cited

U.S. PATENT DOCUMENTS

| 6,366,867 | B2 * | 4/2002 | Sine et al. | 702/107 |
|---|---|---|---|---|
| 6,842,727 | B1 * | 1/2005 | Hayashi | 703/18 |
| 7,043,389 | B2 * | 5/2006 | Plusquellic | 702/117 |
| 2002/0007252 | A1 * | 1/2002 | Sine et al. | 702/107 |
| 2004/0128115 | A1 * | 7/2004 | Chen et al. | 702/191 |
| 2007/0067747 | A1 * | 3/2007 | Checka et al. | 716/5 |
| 2008/0100328 | A1 * | 5/2008 | Dhong et al. | 324/765 |

OTHER PUBLICATIONS

Rajesh Thirugnanam, NPL, "Power line Communications over Power Distribution Networks of Microprocessors—Feasibility Study, Channel Modeling, and a Circuit Design Approach", Jan. 2008.*
Electronics—Tutorials, NPL, "Electronic Tutorials about Series Resonance Circuits", Aug. 1, 2010 (Google Custom Range).*
Makoto Ikeda, NPL, "DVDT: Design for Voltage Drop Test using Onchip Voltage Scan Path", 2000, IEEE.*
Woo Cheol Chung, NPL, "A new approach for massive parallel scan design", IEEE, 2005.*
Ikeda et al., "DVDT: Design for Voltage Drop Test using Onchip-Voltage Scan Path", IEEE 2000 First International Sumposium on Quality Electronic Design. Proceedings. 4 pages.
Chen et al., "Circuit Design Techniques for On-Chip Power Supply Noise Monitoring System", Lecture Notes in Computer Science, Springer Berlin/Heidelberg, vol. 3728, Copyright 2005; 10 pages.

* cited by examiner

*Primary Examiner* — Omar Fernandez Rivas
*Assistant Examiner* — Angel Calle
(74) *Attorney, Agent, or Firm* — Schmeiser, Olsen & Watts; Richard Kotulak

(57) ABSTRACT

A method and device for measuring integrated circuit power supply noise and calibration of power supply noise analysis models. The method includes collecting power supply noise monitor data from an integrated circuit having one or more power supply noise monitors connected between a power supply and respective scan cells of a scan chain and one or more functional circuits connected to the scan chain by scanning a power supply noise generation pattern into the scan chain and scanning a resultant pattern out of the scan chain; converting the resultant data into actual values of selected power supply parameters; generating simulated values of the selected power supply parameters using a power supply noise simulation model based on design data of the integrated chip; comparing the actual values of the selected power supply parameters to the simulated values of the selected power supply parameters; and modifying the power supply noise simulation model based on the comparing.

33 Claims, 10 Drawing Sheets

METHOD AND DEVICE FOR MEASURING INTEGRATED CIRCUIT POWER SUPPLY NOISE AND CALIBRATION OF POWER SUPPLY NOISE ANALYSIS MODELS

FIELD OF THE INVENTION

The present invention relates to the field of integrated circuit design; more specifically, it relates to a method and device for measuring electrical noise on power distribution networks of physical integrated circuits fabricated with an integrated circuit design and subsequent calibration of power supply noise simulation models of the integrated circuit design.

BACKGROUND

As part of the integrated circuit design process, electrical noise in the power distribution network of an integrated circuit design should be modeled to ensure that the physical integrated circuits fabricated from an integrated circuit design will function as intended. However, power supply noise simulation models may not accurately predict actual power supply noise if they do not accurately reflect the integrated circuit design parameters. Accordingly, there exists a need in the art to mitigate the deficiencies and limitations described hereinabove.

SUMMARY

A first aspect of the present invention is a method, comprising: collecting power supply noise monitor data from an integrated circuit having one or more power supply noise monitors directly connected between a power supply and respective scan cells of a scan chain and one or more functional circuits connected to the scan chain by scanning a power supply noise generation pattern into the scan chain and scanning a resultant pattern out of the scan chain; converting the resultant data into actual values of selected power supply parameters; generating simulated values of the selected power supply parameters using a power supply noise simulation model based on design data of the integrated chip; comparing the actual values of the selected power supply parameters to the simulated values of the selected power supply parameters; and modifying the power supply noise simulation model based on the comparing.

A second aspect of the present invention is a method, comprising: (a) applying a reference voltage to a power supply noise monitor directly connected between a power supply and a scan cell of a scan chain of an integrated circuit, the integrated circuit containing a functional circuit connected to the power supply and the scan chain; (b) scanning a power supply noise generation pattern into the scan chain; (c) applying power to the functional circuit and after a time delay applying a control signal to the power supply noise monitor; (d) scanning a resultant pattern out of the scan chain; (e) repeating steps (b) through (d) a first predetermined number of times, each time increasing a value of the time delay; and (f) repeating steps (a) through (e) a second predetermined number of times, each time changing a value of the reference voltage.

A third aspect of the present invention is an integrated circuit, comprising: a scan chain comprising scan cells connected in series; power supply noise monitor circuits directly connected between a power supply and respective scan cells of the scan chain; and functional circuits connected to respective scan cells of the scan chain that are different scan cells than those scan cells the power supply noise monitors are connected to.

These and other aspects of the invention are described below.

BRIEF DESCRIPTION OF THE DRAWINGS

Features of the invention are set forth in the appended claims. The invention itself, however, will be best understood by reference to the following detailed description of an illustrative embodiment when read in conjunction with the accompanying drawings, wherein:

DETAILED DESCRIPTION

The embodiments of the present invention provide a method and an integrated circuit for correlating simulated power supply noise to the actual power supply noise generated in physical integrated circuits and a method for modifying integrated circuit power supply noise simulation models based on the correlations obtained. Power supply noise is electrical noise impressed the voltage signal of a power distribution network by the switching of the various circuits of an integrated circuit powered by the power distribution network on and off. A power distribution network comprises power buses. The term "power supply" is defined as the power distribution network of an integrated circuit chip and not the actual power source, such as a battery, a solar cell array or an external AC power supply.

Figure 1:
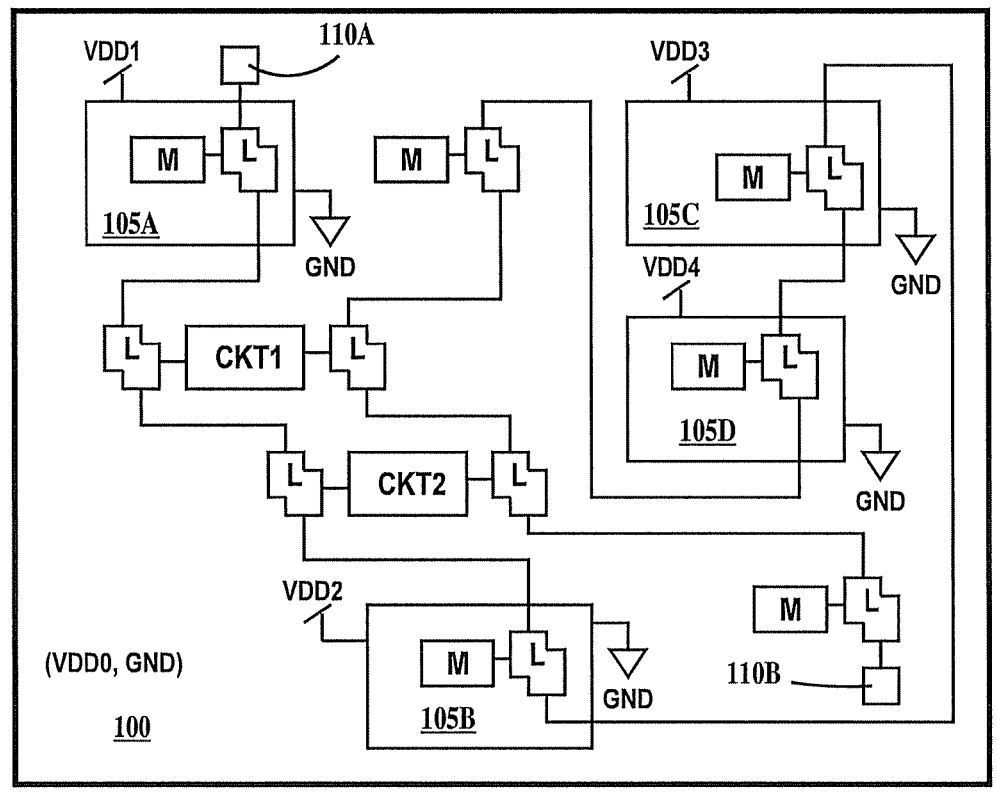
FIG. 1 is a diagram of a first integrated circuit according to an embodiment of the present invention.

FIG. 1 is a diagram of a first integrated circuit according to an embodiment of the present invention. In FIG. 1, an integrated circuit 100 includes voltage regions (e.g., voltage islands) 105A, 105B, 105C and 105D. Power supply buses within voltage island 105A are connected to a voltage source VDD1. Power supply buses within voltage island 105B are connected to a voltage source VDD2. Power supply buses within voltage island 105C are connected to a voltage source VDD3. Power supply buses within voltage island 105D are connected to a voltage source VDD4. Other (non-voltage island) regions of integrated circuit 100 have power supply buses connected to a voltage source VDD0. In one example, voltage source VDD0 is supplied externally and voltage sources VDD1, VDD2, VDD3 and VDD4 are generated from VDD0. In one example, voltages source VDD0, VDD1, VDD2, VDD3 and VDD4 are coupled (through circuits) to a common ground (GND). In one example, one or more of VDD0, VDD1, VDD2, VDD3 and VDD4 are supplied by external voltage sources. Within each voltage island 105A, 105B, 105C and 105D (in addition to functional circuits) is a power supply noise monitor "M" and a scan cell "L." The non-voltage island regions of integrated circuit 100 include (besides functional circuits connected between VDD0 and GND) optional power supply noise monitors "M" and scan cells "L." Some of the non-voltage island circuits "CKT1" and "CKT2" are connected between two scan cells "L." Scan cells "L" are connected in series between a scan input pin (or I/O pad) 110A and a scan output pin (or I/O pad) 110B. Scan input pin 110A, scan cells "L" and scan output pin 110B form a circuit called a boundary scan chain described in further detail infra with respect to FIG. 5.

Figure 3:
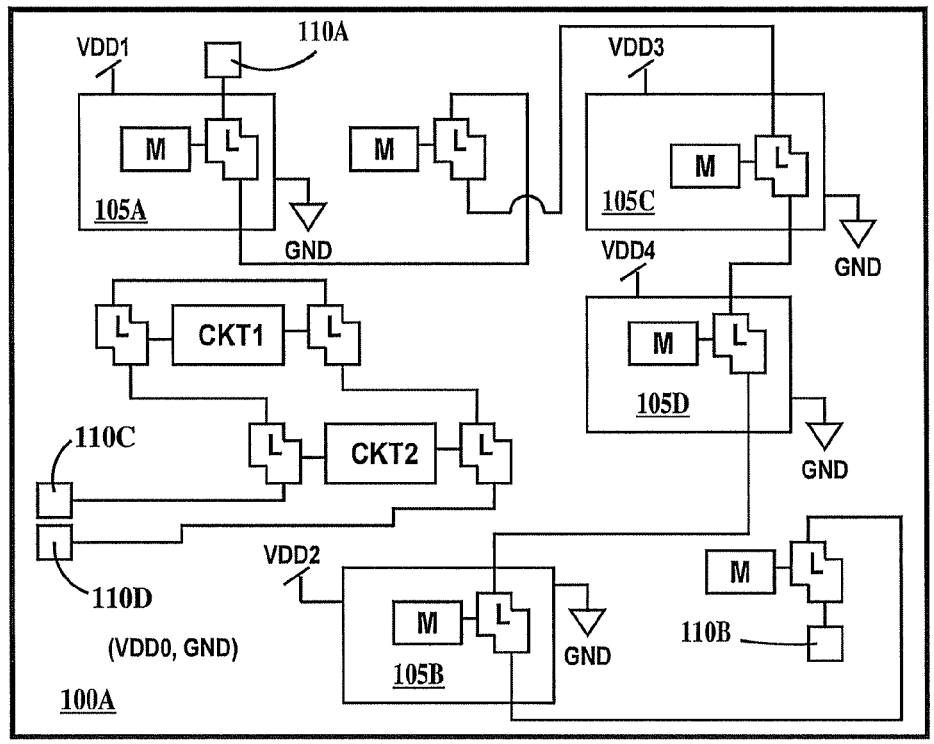
FIG. 3 is a diagram of a second integrated circuit according to an embodiment of the present invention.

FIG. 3 is a diagram of a second integrated circuit according to an embodiment of the present invention. In FIG. 3, an integrated circuit 100A is similar to integrated circuit 100 of FIG. 1 except, voltage islands 105A, 105B, 105C and 105D are connected in a first scan chain between scan in pin 110A and scan out pin 110B and circuits "CKT1" and "CKT2" are connected in a separate boundary scan chain between scan in pin 110C and scan out pin 110D.

It should be understood that in FIGS. 1 and 3, while only four voltage islands are illustrated, there may be any number of voltage islands. Further, while each voltage island 105A, 105B, 105C and 105D is supplied by a different voltage some voltage islands may be supplied by the same voltage source. Still further, the nominal voltage values of VDD1, VDD2, VDD3 and VDD4 may be all different or various combinations of voltage islands may have the same nominal voltage value. Finally, not all voltage islands need contain a voltage monitor/scan cell or may contain more than one voltage monitor/scan cell. Likewise, the non-voltage island regions may contain no or any number of voltage monitor/scan cells.

Figure 2:
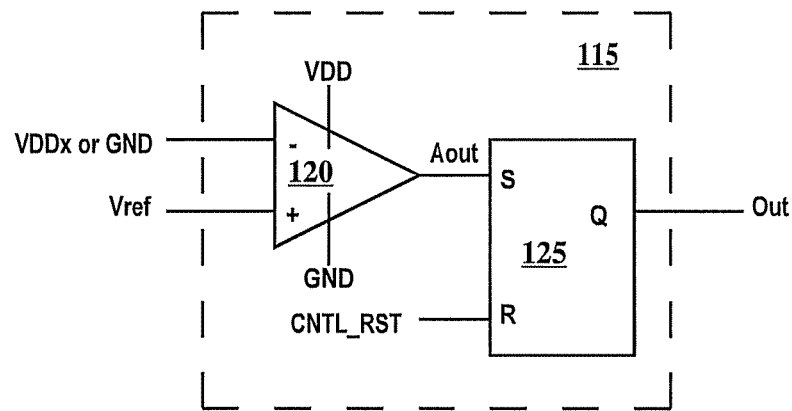
FIG. 2 is a schematic diagram of a first exemplary power supply noise monitor according to embodiments of the present invention.

FIG. 2 is a schematic diagram of a first exemplary power supply noise monitor according to embodiments of the present invention. In FIG. 2, a power supply noise monitor 115 includes a differential amplifier 120 and a latch 125. The inputs to power supply noise monitor 115 are VDDx or ground to the negative or inverting input of differential amplifier 120 and Vref to the positive input or non-inverting of differential amplifier 120. VDDx represents VDD0, VDD1, VDD2, VDD3 or VDD4 of FIGS. 1 and 3. Vref is supplied by an off-chip power supply, in one example, from a tester. Differential amplifier 120 is powered by VDD/GND which, in one example is a power supply used by an integrated circuit for powering I/O circuits. In one example, VDD is VDD0. The output of differential amplifier 120 is a voltage Aout which is inputted to the set (S) input of latch 125. A control reset signal CNTL_RST is connected to the reset input (R) of latch 125. The output (Q) of latch 125 is the output of power supply noise monitor 115.

The output of power supply noise monitor 130 is either a zero or a one (e.g., a one if Vref>VDDx or a zero if Vref<VDDx). By comparing the value of Q at different values of applied Vref at the same time after power on, the value of VDDx can be estimated. For example if a Vref=0.9 volts at a time T1 the output is zero, at Vref=0.89 volts at time T1 the output is zero and at Vref=0.88 at time T1 the output is 1, then VDDx is between 0.89 and 0.88 volts. Using an algorithm, VDDx could be estimated at 0.885 volts. By sweeping the CNTL_RST signal across multiple clock cycles T1 to Tn at a given Vref, the actual power supply noise waveform (see FIG. 7) can be reconstructed. That is for each Vi=V1 to Vm turn CNTRL-RST on at times Ti=T1 to Tn, where n and m are positive integers. Time T1 is the time power is turned on the power supply and time Tn is a time after the power supply distribution waveform reaches steady state AC response (see FIG. 7). A three dimensional matrix of Vi, Ti and Q will be generated (or for each Tn, a two dimensional matrices of Vi vs. Q will be generated). At high clock frequencies found in modern integrated circuits, the time intervals can be tenths of a nano-second, and with Vref intervals of a hundredth of a volt, a very accurate reconstruction of the power supply waveform (see FIG. 7) can be obtained. Additionally, repeating the Ti to Tn/Vi to Vm sweeps at different temperatures allows full power supply characterization.

Figure 4:
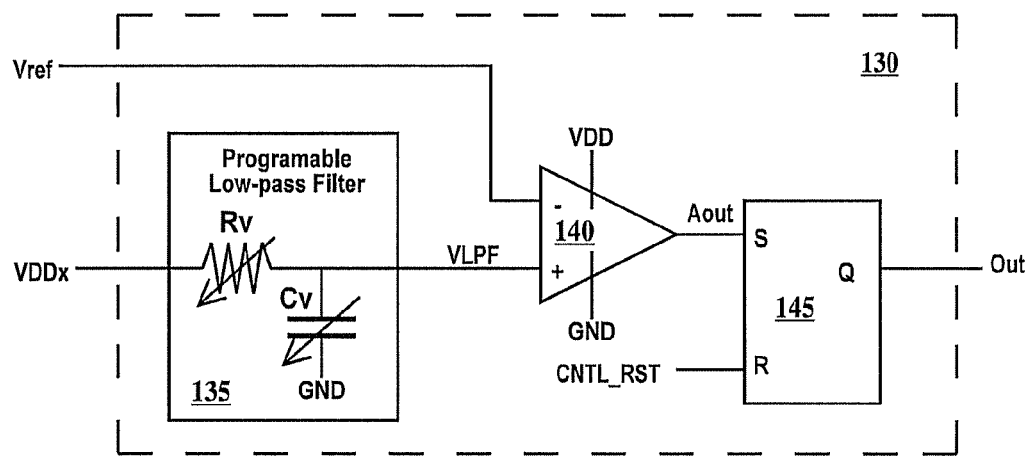
FIG. 4 is a schematic diagram of a second exemplary power supply noise monitor according to embodiments of the present invention.

FIG. 4 is a schematic diagram of a second exemplary power supply noise monitor according to embodiments of the present invention. In FIG. 4, a power supply noise monitor 130 includes a programmable low-pass filter (PLPF) 135, a differential amplifier 140 and a latch 145. The inputs to power supply noise monitor 130 are VDDx or ground (to the input of PLPF 135) and Vref to the positive input of differential amplifier 140. The output of PLFF 135, a voltage VLPF is connected to the positive input of differential amplifier 140. VDDx represents VDD0, VDD1, VDD2, VDD3 or VDD4 of FIGS. 1 and 3. Vref is supplied by an off-chip power supply (in one example, from a tester. Differential amplifier 140 is powered by VDD/GND which, in one example is a power supply used by an integrated circuit for powering I/O circuits. In one example, VDD is VDD0. The output of differential amplifier 140 is a voltage Aout which is inputted to the S input of latch 145. A control reset signal CNTL_RST is connected to the R input of latch 145. The output of latch 145 is the output of power supply noise monitor 130. PLPF 135 includes a variable resistor Rv and a variable capacitor Cv. Rv is connected between the input and output of PLPF 135 and Cv is connected between the output of PLPF 135 and GND.

The output of power supply noise monitor 130 is either a zero or a one (e.g., a one if Vref>VDDx or a zero if Vref<VDDx). By comparing the value of Q at different values of applied Vref at the same time after power on, the value of VDDx can be estimated. For example if a Vref=0.9 volts at a time T1 the output is zero, at Vref=0.89 volts at time T1 the output is zero and at Vref=0.88 at time T1 the output is 1, then VDDx is between 0.89 and 0.88 volts. Using an algorithm, VDDx could be estimated at 0.885 volts. By sweeping the CNTL_RST signal across multiple clock cycles T1 to Tn at a given Vref, the actual power supply noise waveform (see FIG. 7) can be reconstructed. That is for each Vi=V1 to Vm turn CNTRL-RST on at times Ti=T1 to Tn, where n and m are positive integers. Time T1 is the time power is turned on the power supply and time Tn is a time after the power supply distribution waveform reaches steady state AC response (see FIG. 7). A three dimensional matrix of Vi, Ti and Q will be generated (or Tn two dimensional matrices of Vi vs. Q. At high clock frequencies found in modern integrated circuits, the time intervals can be tenths of a nano-second, and with Vref intervals of a hundredth of a volt, a very accurate reconstruction of the power supply waveform (see FIG. 7) can be obtained. Additionally, by repeating the Ti to Tn/Vi to Vm sweeps at different settings of Rv and Cv the effect of frequency on noise can be measured. This is important; as variable frequency noise measurement provides the average voltage a circuit will see over its cycle-time and is required for chip timing analysis. Additionally, repeating the Ti to Tn/Vi to Vm sweeps at different temperatures allows full power supply characterization.

Power supply noise monitors 115 and 130 of respective FIGS. 2 and 4 are examples of the types of power supply noise monitor circuits that can be utilized by embodiments of the present invention. Other power supply noise monitors may be used. Further, more than one type of power supply noise monitor may be present on an integrated circuit according to embodiments of the present invention. In other words, the power supply noise monitor circuits "M" of FIGS. 1 and 3 may not be all the same.

Figure 5:
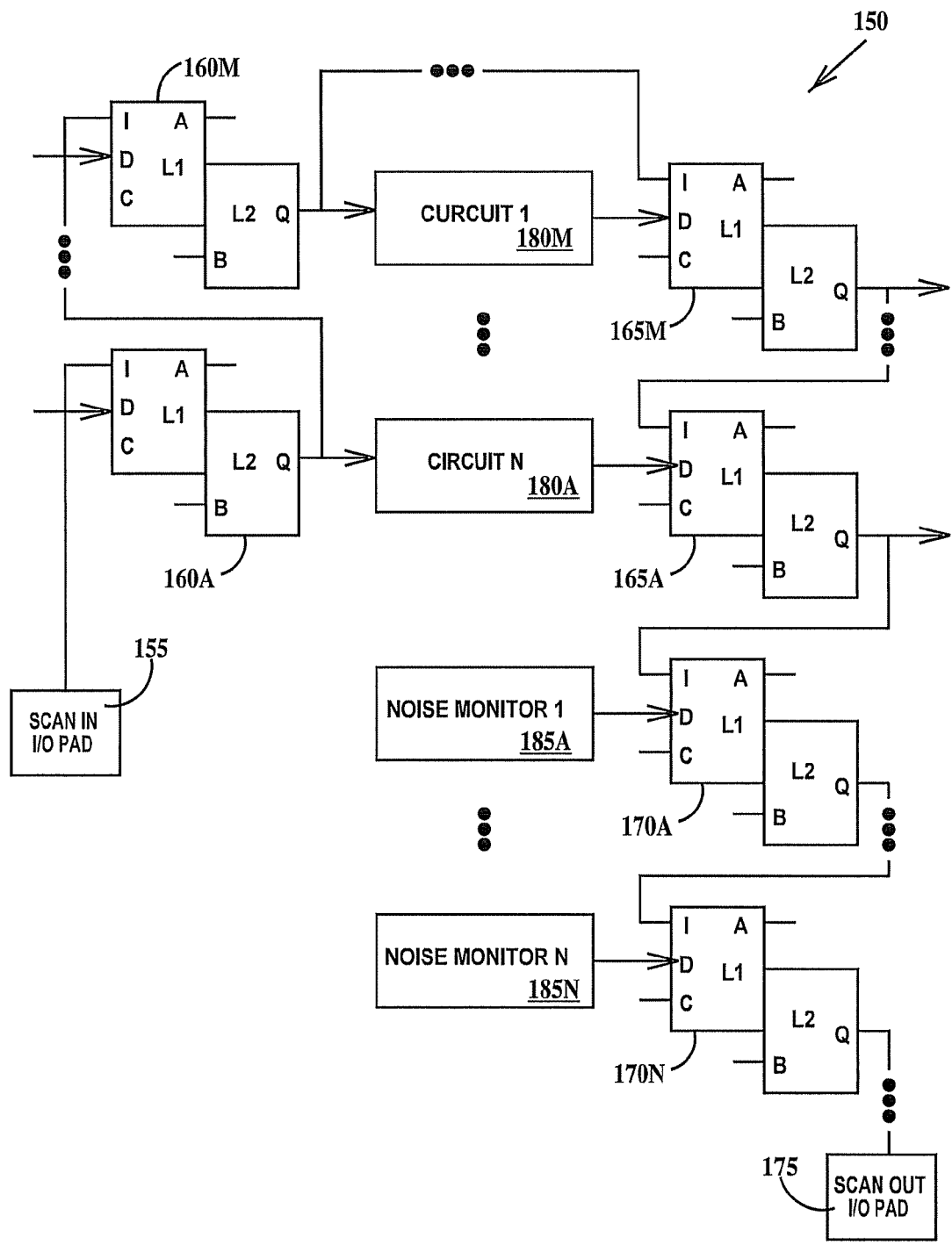
FIG. 5 is a schematic diagram of an exemplary implementation of a method for capturing power supply noise data according to embodiments of the present invention.

FIG. 5 is a schematic diagram of an exemplary implementation of a method for capturing power noise data according to embodiments of the present invention. In FIG. 5, a scan chain 150 includes a scan in pad (e.g., scan in I/O pad) 155, scan cells 160A through 160M, 165A through 165M, 170A though 170N, and a scan out pad (e.g., scan out I/O pad) 175. Scan cells 160A through 160M, 165A through 165M, and 170A though 170N comprise L1L2 latches. Each L1 section has an I data input, a D data input, an A clock input and a C clock input. Each L2 section has a Q output and a B clock input. Scan cells 160A through 160M, 165A through 165M, and 170A though 170N are connected in series between scan in pad 155 and scan out pad 175, The Q output of a previous scan cell is connected to the I input of a subsequent scan cell. D inputs of scan cells 160A through 160M are may be connected to other functional circuits. Scan input pad 155 is connected to the I input of scan cell 160A. The Q output of scan cells 160A through 160M are connected to the inputs of respective functional circuits 180A through 180M. The output of functional circuits 180A through 180M are connected to the D inputs of respective scan cells 165A through 165M. The output of power supply noise monitors 185A through 185N are connected to the D inputs of respective scan cells 170A through 170N. The Q outputs of scan cells 165A through 165 may be connected to other functional circuits. The D inputs of scan cells 170A through 170N are connected to D inputs of respective scan cells 170A through 170N. The Q output of scan cell 170N is connected to scan out pad 175.

The A CLK latches the signal at the I input into the L1 section. The B-CLK latches the contents of the L1 section into the L2 section where it present on the Q output. The C CLK latches the signal at the D input into the L1 section. In operation, a power supply noise generation pattern of zero and ones is scanned into the scan L2 latches of scan chain 150 by A CLK pulses on the A CLK inputs and B CLK pulses on the B CLK inputs. The power supply noise generation pattern is designed to cause the various functional circuits to draw or not draw power from power supply buses powering the functional circuits 170A through 170M. As the power supply noise generation pattern is "clocked in" a resultant pattern is "clocked out." The resultant pattern not only includes out data from the functional circuits, but power supply noise monitor data from the power supply noise monitors that is related to the "instantaneous" voltage level on the power supply supplying functional circuits 180A through 180M at any given A CLK or C CLK pulse. The noise data and functional circuit data thus need to be sorted.

There may be any number of scan cells in a given scan chain and any number of functional circuits and power supply noise monitors may be connected to a scan cell. While FIG. 5 illustrates the functional circuits grouped at the beginning of the scan chain and the power supply noise monitors at the end of the scan chain, generally, the functional circuits and power supply noise monitors are intermixed as to position in the scan chain based on the location of functional circuits, power supply noise monitors and scan cells on the integrated circuit. If separate scan chains are used for functional circuits and power supply noise monitors (as, for example in FIG. 2) the same methodology applies as when functional circuits and power supply noise monitors are connected in a single scan chain, except there are two data streams instead of one so the sorting of power supply noise monitor data from functional circuit data is not required.

Referring to FIGS. 2, 4 and 5 the CNTL_RST is asserted and clocked (C clock) before power supply noise patterns are clocked (A and B clocks) through the scan chain 150 of FIG. 5 to set latches 185A through 185N to a known state. As the power supply noise pattern is clocked (A and B clocks) through scan chain 150 some of latches 125 (FIG. 2) or latches 145 (FIG. 4) will trip if there is a sufficient difference between the power supply input and Vref.

Figure 6:
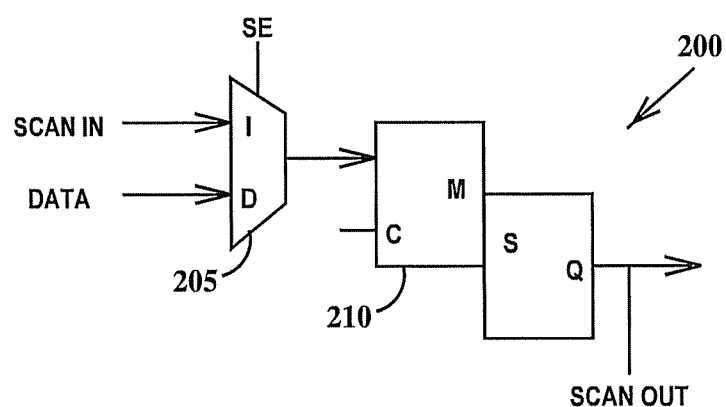
FIG. 6 is a schematic diagram of an alternative scan chain cell according to embodiments of the present invention.

FIG. 6 is a schematic diagram of an alternative scan chain cell according to embodiments of the present invention. In FIG. 6, a scan cell 200 (or MUX Scan Latch) includes a de-multiplexer 205 and a master/slave (M/S) latch 210. De-multiplexer 205 includes an I input, a D input a select enable (SE) control input and an output. MS latch 210 includes a D input, an A CLK input, a D clock input and a Q output. When multiple scan chain cells 200 are connected into a scan chain, the I and D inputs of de-multiplexer 205 and Q output of M/S latch correspond to the I input, D input and Q output of the scan cells of FIG. 5. The SE effectively replaces the A and B CLKS of the scan cells of FIG. 5.

Figure 7:
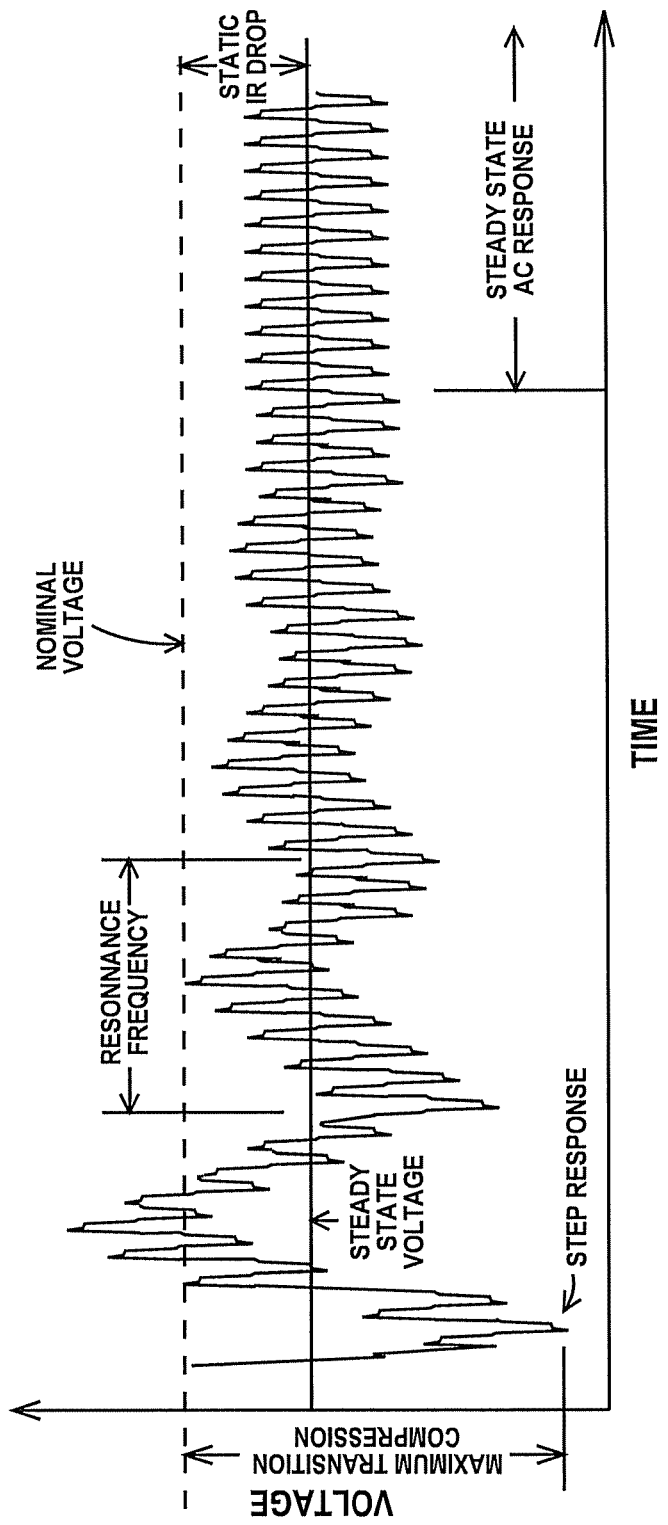
FIG. 7 is a plot of voltage vs. time for a non-ideal at-circuit voltage response of an integrated circuit.

FIG. 7 is a plot of voltage vs. time for a non-ideal at-circuit voltage response of an integrated circuit. In FIG. 7, an exemplary power supply waveform (a plot of voltage on the power supply vs. time) from power on to steady state of circuits connected to the power supply is illustrated. The nominal voltage on the power supply is indicated by the horizontal dashed line. The steady state AC response voltage is indicated by the solid horizontal line. Three phases in time are illustrated. In the first phase or step response phase there is a large drop in voltage in voltage as the circuit are switched on. In the second phase, there are several cycles of decreasing voltage amplitude oscillations about the steady state voltage level until in the third phase or steady state AC response phase the voltage amplitude oscillates uniformly about the steady state voltage. Cycles refers to the resonant frequency which is marked in FIG. 7. Also marked on FIG. 7 is a voltage value called the maximum transient compression, which is discussed infra.

The step response occurs when power demand changes abruptly. The magnitude of the step response increases with package inductance and decreases with integrated circuit capacitance. Integrated circuits are conventionally mounted on a package (or a printed circuit board). The package conventionally includes decoupling capacitors connected between I/O pads and ground. The oscillations are damped at LC resonance frequency. The steady state AC response is due to periodic circuit switching. It is primarily a function of "quiet" chip capacitance. AC variation decreases with increased circuit switching frequency. The static IR drop is a response to average integrated circuit power consumption and is function of resistance only. The static IR drop is the difference between nominal voltage and steady state voltage. According to embodiments of the present invention, a simulated waveform may be generated by simulation of a model of an integrated circuit based on design data for the integrated circuit and data describing the simulated waveform stored on a computer readable medium and/or the simulated waveform displayed on a computer screen. According to embodiments of the present invention, an actual waveform may be constructed from resultant data scanned out an actual integrated circuit based on the design data for the integrated circuit to integrated and data describing the actual waveform stored on a computer readable medium and/or the actual waveform displayed on a computer screen. The data describing the actual waveform may be compared to the data describing the simulated waveform. The actual waveform may be compared to the simulated waveform, e.g., on a computer display.

Figure 8:
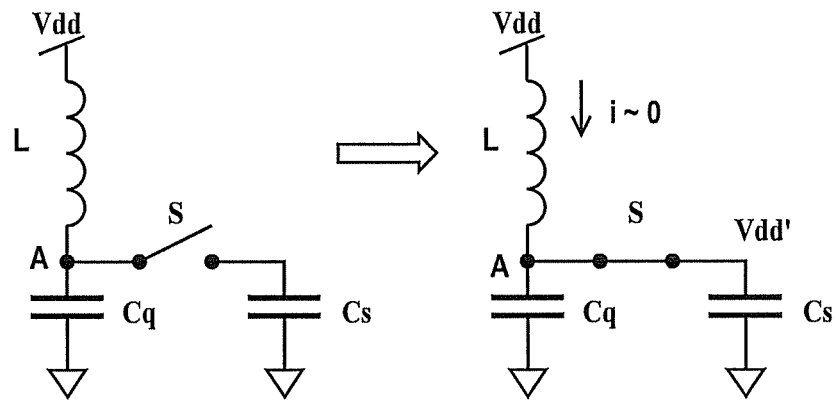
FIG. 8 illustrates transient compression modeling.

FIG. 8 illustrates transient compression modeling. In FIG. 8, a transient compression model includes a chip quiet capacitor Cq, a switched capacitor Cs, an inductor L and a switch S. Inductor L is connected between Vdd and a node A. Capacitor Cq is connected between node A and ground. Switch S is connected between node A and capacitor Cs. Capacitor Cs is connected between switch S and ground. The left-hand side of FIG. 8 illustrates the model with switch S open. The right-hand side of FIG. 8 illustrates the model with switch S closed, with a voltage Vdd' across capacitor Cs. Dynamic charge sharing requires "instantaneous" power supply collapse:

$$Vdd'/Vdd = Cq/(Cq+Cs) \quad (1)$$

where

Cq=Ci+Cd,

Ci is the intrinsic on-chip capacitance of the integrated circuit,

Cd is the on-chip decoupling capacitance of the integrated circuit,

Cs is the switched capacitance;

Vdd is the nominal power supply voltage, and

Vdd' is the voltage across Cs.

Additional on-chip decoupling capacitance can be inserted to limit the power supply collapse to a specified level:

$$Cd = k(Cs-Ci) \quad (2)$$

where k=Vdd'/(Vdd-Vdd').

Figure 9:
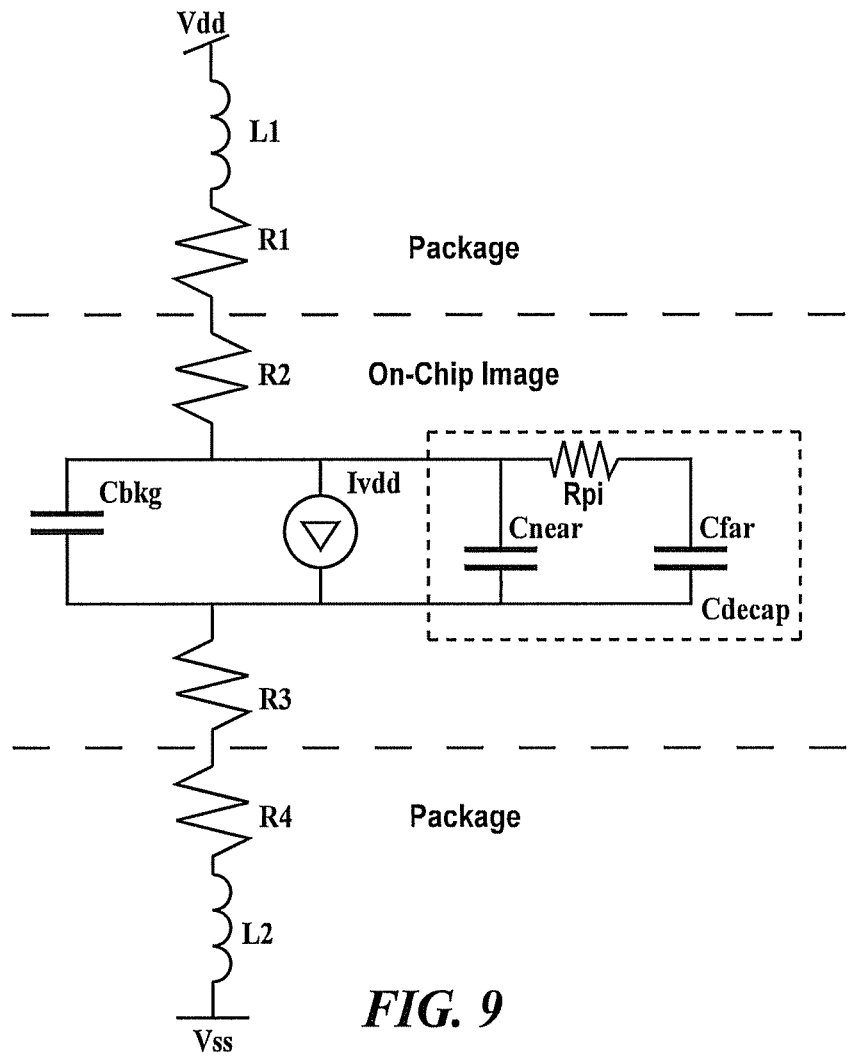
FIG. 9 illustrates a simplified power supply noise simulation model and sources of parasitic elements modeled.

FIG. 9 illustrates a simplified power supply noise simulation model and sources of parasitic elements modeled. The power supply noise simulation model is an RLC network including on-chip capacitance and resistance and package inductance and resistance with the integrated circuit mounted on and electrically connected to the package. In FIG. 9, a power supply noise simulation model includes connected in series between Vdd and Vss (in one example Vss is GND), an inductor L1, a resistor R1, a resistor R2, a capacitor Cbkg, a resistor R3, a resistor R4 and an inductor L2. Connected in parallel with capacitor Cbkg, an on chip current demand Ivdd, and a decoupling capacitor Cdecap. On-chip decoupling capacitor Cdecap includes a capacitor Cnear and a capacitor Cfar connected both of which are connected in parallel with capacitor Cbkg. On-chip decoupling capacitor Cdecap further includes a resistor Rpi connected between capacitor Cnear and capacitor Cfar. Inductors L1 and L2 and R1 and R4 are associated with the package, capacitors Cbkg, Cnear, Cfar and resistors R2, R3 and Cfar are associated with the integrated circuit.

The power supply noise simulation model uses values of L1, L2, R1 and R4 extracted from RL package models. The power supply noise simulation model uses inputted values of R2 and R3. The power supply noise simulation model models Ivdd as an ideal current source. The power supply noise simulation model relies on an assumed design value for Cbkg (the on-chip quiet capacitor). The power supply noise simulation model relies on design values selected from a design library for Cnear and Cfar and Rpi. Rpi is the intrinsic resistance of Cdecap. Cnear represents capacitance closest to the switching event and Cfar represents capacitance furthest removed from the switching event in terms of circuit interconnect distance. Most of the charge stored by Cdecap is stored in Cfar. All the inputs to the power supply noise simulation model are derived from design data not hardware data.

Figure 10:
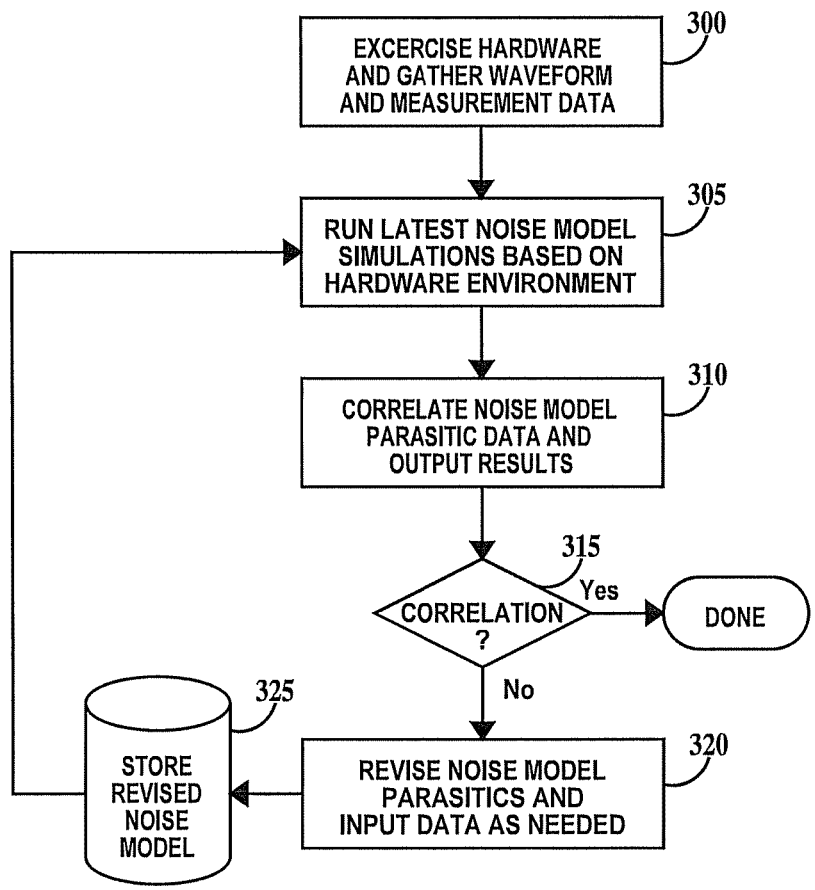
FIG. 10 is a flowchart of a method of modifying power supply noise simulation models according to embodiments of the present invention.

FIG. 10 is a flowchart of a method of modifying power supply noise simulation models according to embodiments of the present invention. In step 300, hardware is tested and actual power supply noise waveform data (e.g., see FIG. 7) is collected. This is described in more detail infra with respect to FIG. 11. In step 305 the power supply noise simulation model is run (e.g., see FIG. 9 and description supra) and simulated power supply waveform data is collected. In step 310, the actual power supply waveform data from step 300 is correlated to the simulated power supply waveform data from step 305. In step 315, the degree of correlation is accessed. If the actual power supply waveform data correlates to the simulated power supply waveform data to a value degree of correlation then the method terminates otherwise the method proceeds to step 320. The degree of correlation may be obtained by calculation of correlation coefficients or by graphical comparison of the actual and simulated power supply waveforms. In step, 320, the power supply noise model is revised and stored in step 325. The method then loops back to step 305.

Figure 11:
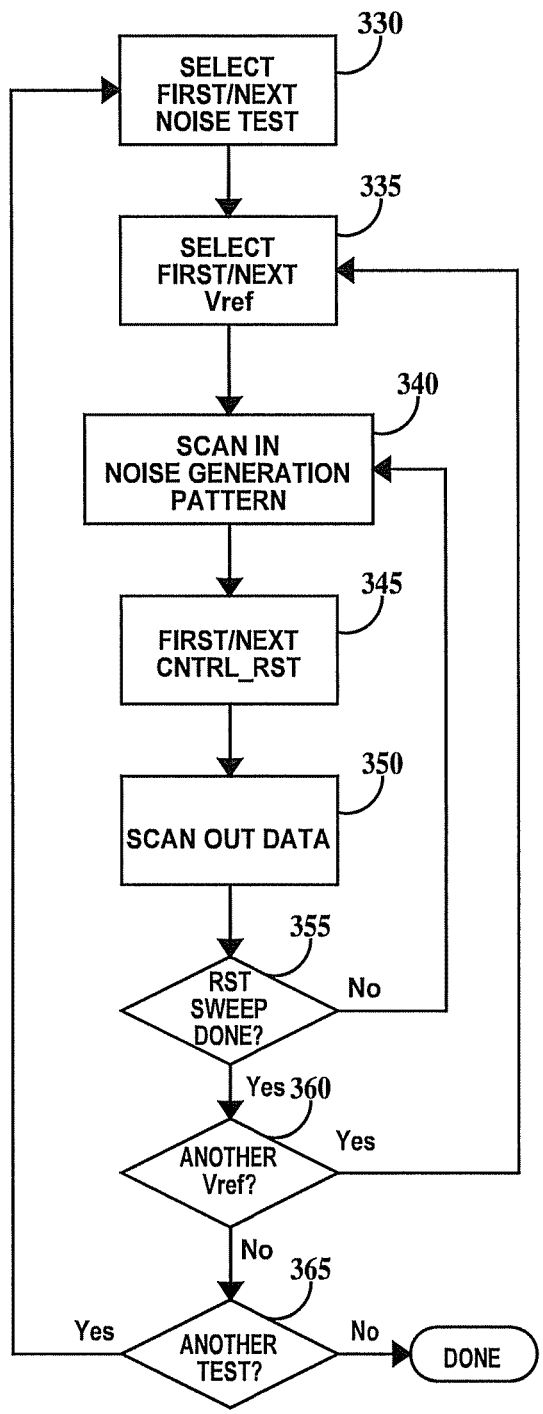
FIG. 11 is a flowchart of a method of generating power supply noise waveform data according to embodiments of the present invention.

FIG. 11 is a flowchart of a method of generating power supply noise waveform data according to embodiments of the present invention. This flowchart illustrates step 300 of the flowchart of FIG. 10. Preparatory to performing the following steps, an actual integrated circuit having a scan chain and power supply noise monitors according to embodiments of the present invention is mounted on a chuck of a tester and probes are contacted to the I/O and power pads of the chip. In step 330 the first (i.e., initial)/next noise test is selected. The noise test selected sets values of VDDx (the power supply nominal voltage), temperature and depending on the power supply noise monitor, noise frequency settings. The tester can control the chip temperature by either heating or cooling the chuck on which the integrated circuit is temporary mounted during testing. In step 335, first (i.e., initial)/next value of Vref is selected and applied to the power supply noise monitors. In step 340 a noise generation test pattern is scanned into the scan chain. In step 345, a control signal (CNTL_RESET) is turned on, where each time through the loop 340 to 355, the CNTRL_RST signal is turned on at an incrementally later time than the previous time through the loop. In step 350, the latched data is scanned out. In step 355, it is determined if the sweeping of CNTL_RST is complete. If not, the method loops back to step 340, otherwise the method proceeds to step 360. In step 360 it is determined if another value of Vref is to be applied. If another value of Vref is to be applied, the method loops back to step 335 where the value of Vref is incremented, otherwise the method proceeds to step 365. Alternatively, each time through step 335 the value of Vref is decremented. In step 365, it is determined if another test at another VDDx or temperature is to be performed. If not, the method terminate, otherwise the method loops back to step 330 where either or both of VDDx and temperature is changed and the value of Vref is reset to an initial value.

Figure 12:
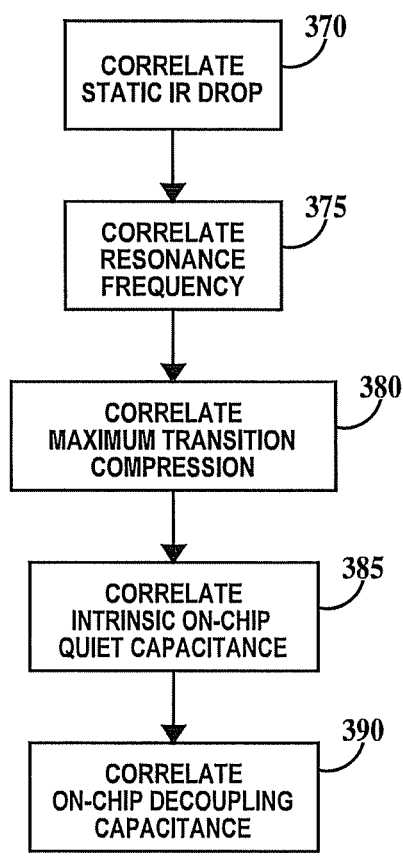
FIG. 12 is a flowchart of the correlation step of FIG. 10.

FIG. 12 is a flowchart of the correlation step of FIG. 10. This flowchart illustrates step 310 of the flowchart of FIG. 10. In step 370, the static IR drop (e.g., see FIG. 5) is correlated. Step 370 compares a simulated static IR drop value of a power signal on the power supply to an actual static IR drop of the power signal. The simulated static IR drop value is based on the equation:

$$Pavg = (Iavg * Iavg * R) \quad (3)$$

where:

Pavg is the average power,

Iavg is the average current, and

R equal to the sum of package resistance plus on-chip resistance.

In step 375, the resonance frequency (e.g., see FIG. 7) is correlated. Step 375 compares a simulated resonance frequency value of a power signal on said power supply to an actual resonance frequency value of said power signal. The simulated resonance frequency value is based on the equation:

$$\text{Resonant Frequency} = \frac{1}{2\pi\sqrt{LC}} \quad (4)$$

where:

L is the extracted package inductance, and

C is the intrinsic on-chip quiet capacitance.

In step 380, the maximum transition compression (e.g., see FIG. 7) is correlated. Step 380 compares a simulated maximum transition compression value of a power signal on the power supply to an actual maximum transition compression of the power signal. The simulated maximum transition compression value is based on the equation:

$$Vdd'/Vdd = Cq/(Cq+Cs) \quad (5)$$

where:

Cq=Ci+Cd,

Ci is the intrinsic on-chip capacitance of the integrated circuit,

Cd is the on-chip decoupling capacitance of the integrated circuit,

Cs is the switched capacitance;

Vdd is the nominal power supply voltage, and

Vdd' is the voltage across Cs.

Step 380 further assesses whether an intrinsic resistance (e.g., Rpi of FIG. 9) of the on-chip decoupling capacitance has any effect on the simulated maximum transition compression value by comparing the measured and simulated maximum transition compressions, once the hardware and noise tool parasitic capacitance values (Ci and Cd) are correlated, to asses whether still outstanding differences in compression are due to instantaneous IR-drop across the Cdecap intrinsic resistance Rpi.

In step 385, the intrinsic on-chip quiet capacitance is correlated. Step 385 compares the simulated intrinsic on-chip quiet capacitance (e.g., Cbkg of FIG. 9) when on-chip decoupling capacitance (e.g., Cdecap of FIG. 9) is set to zero to an actual intrinsic on-chip quiet capacitance value.

In step 390, on-chip decoupling capacitance (e.g., Cdecap of FIG. 9) is correlated. Step 390 compares a simulated on-chip decoupling capacitance when on-chip intrinsic quite capacitance (e.g., Cbkg of FIG. 9) is set to zero to an actual on-chip decoupling capacitance value. The actual measurement is made in regions of the integrated circuit with little to no logic circuits (e.g., isolated memory arrays within voltage islands).

Generally, the method described herein with respect to a method for a method of generating power supply noise waveforms according to embodiments of the present invention is practiced with a computer linked to or included in a test system and the methods described supra in the flow diagrams FIG. 11 may be coded as a set of instructions on removable or hard media for use by the computer.

Generally, the method described herein with respect to a method of modifying power supply noise simulation models according to embodiments of the present invention is practiced with a general-purpose computer and the methods described supra in the flow diagrams of FIG. 12 (using models such as those in FIGS. 9 and 10) may be coded as a set of instructions on removable or hard media for use by a the general-purpose computer.

Figure 13:
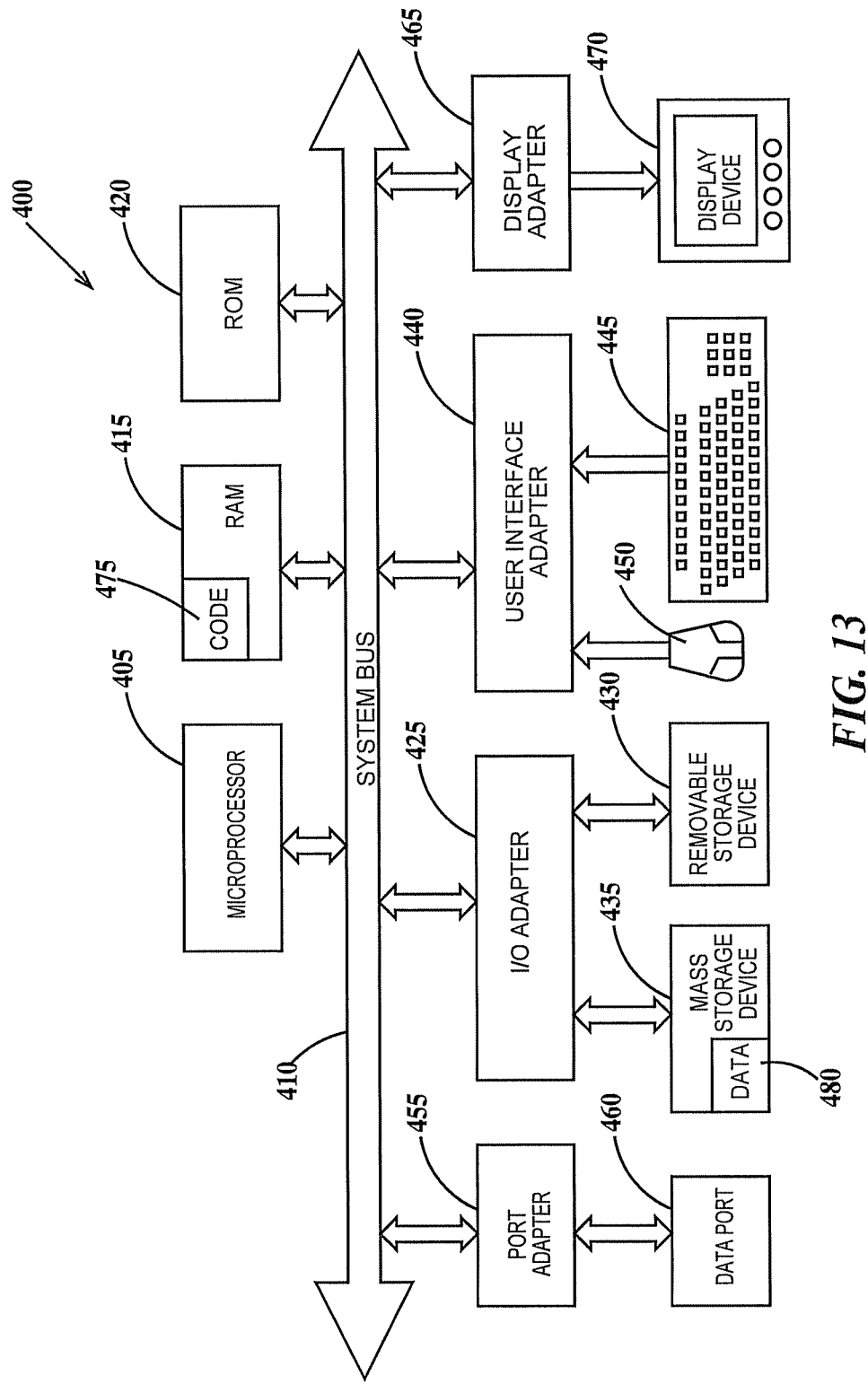
FIG. 13 is a schematic block diagram of a general-purpose computer.

FIG. 13 is a schematic block diagram of a general-purpose computer. In FIG. 13, computer system 400 has at least one microprocessor or central processing unit (CPU) 405. CPU 405 is interconnected via a system 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include electronic, magnetic, optical, electromagnetic, infrared, and semiconductor devices. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

Thus, the embodiments of the present invention provide a method and an integrated circuit for correlating power supply noise to the actual power supply noise generated in physical integrated circuits and thus allowing modification of integrated circuit power supply noise simulation models based on the correlation wherein the modified models more accurately predict actual power supply noise.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
   collecting power supply noise monitor data from an integrated circuit having one or more power supply noise monitors directly connected between a power supply and respective scan cells of a scan chain and one or more functional circuits connected to different respective scan cells of said scan chain by scanning a power supply noise generation pattern into said one or more functional circuits through said scan chain and scanning a resultant data out of said scan chain;
   converting said resultant data into actual values of power supply parameters;
   generating simulated values of said power supply parameters using a power supply noise simulation model based on design data of said integrated circuit;
   comparing said actual values of said power supply parameters to said simulated values of said power supply parameters; and
   modifying said power supply noise simulation model based on said comparing.

2. The method of claim 1, further including:
   converting said resultant data into a voltage versus time waveform of a power signal on said power supply and displaying said waveform on a computer screen or storing data describing said waveform on a computer storage medium or both displaying said waveform on a computer screen or storing data describing said waveform on a computer storage medium.

3. The method of claim 1, wherein said power supply parameters are selected from the group consisting of a static IR drop of a power signal on said power supply, a resonance frequency of said power signal on said power supply, a maximum transition compression of said power signal on said power supply, intrinsic on-chip quiet capacitance of said integrated circuit, and on-chip decoupling capacitance of said integrated circuit.

4. The method of claim 1, wherein said power supply noise simulation model is an RLC network describing said integrated circuit mounted on and electrically connected to a package, said RLC simulation model including on-chip capacitance and resistance and package inductance and resistance.

5. The method of claim 4, further including:
   converting said resultant data into an actual static IR drop value of a power signal on said power supply;
   comparing a simulated static IR drop value of said power signal on said power supply to said actual static IR drop of said power signal; and
   wherein said simulated static IR drop value is based on the equation:

$$Pavg=(Iavg*Iavg*R)$$

where:
   Pavg is an average power of said power supply,
   Iavg is an average current of said power supply, and
   R equal to a sum of package resistance plus on-chip resistance.

6. The method of claim 4, further including:
   converting said resultant data into an actual resonance frequency value of a power signal on said power supply;
   comparing a simulated resonance frequency value of said power signal on said power supply to said actual resonance frequency value of said power signal; and
   wherein said simulated resonance frequency value is based on the equation:

$$\text{Resonant Frequency} = \frac{1}{2\pi\sqrt{LC}}$$

where:
   L is an extracted package inductance, and
   C is an intrinsic on-chip quiet capacitance.

7. The method of claim 4, further including:
   converting said resultant data into a simulated maximum transition compression value of a power signal on said power supply;
   comparing a simulated maximum transition compression value of said power signal on said power supply to said actual maximum transition compression of said power signal; and
   wherein said simulated maximum transition compression value is based on the equation:

$$Vdd'/Vdd=Cq/(Cq+Cs)$$

where:
   Cq=Ci+Cd,
   Ci is an intrinsic on-chip capacitance of the integrated circuit,
   Cd is an on-chip decoupling capacitance of the integrated circuit,
   Cs is a switched capacitance;
   Vdd is a nominal power supply voltage, and
   Vdd' is a voltage across Cs.

8. The method of claim 7, further including:
   converting said resultant data into an intrinsic resistance of said on-chip decoupling capacitance value of a power signal on said power supply; and
   determining whether said intrinsic resistance of said on-chip decoupling capacitance has any effect on said simulated maximum transition compression value.

9. The method of claim 1, further including:
   converting said resultant data into an actual intrinsic on-chip quiet capacitance value of a power signal on said power supply; and
   comparing a simulated intrinsic on-chip quiet capacitance when on-chip decoupling capacitance is set to zero to said actual intrinsic on-chip quiet capacitance value.

10. The method of claim 1, further including:
    comparing a simulated on-chip decoupling capacitance when on-chip intrinsic quite capacitance is set to zero to an actual on-chip decoupling capacitance value.

11. The method of claim 1, further including:
    collecting said power supply noise monitor data at different frequencies of a power signal applied to said power supply.

12. The method of claim 1, further including:
    collecting said power supply noise monitor data at different temperatures of said integrated circuit.

13. The method of claim 1, wherein said collecting said power supply noise data includes
    setting a time delay and a reference voltage;
    (a) applying said reference voltage to at least one power supply noise monitor of said one or more power supply noise monitors;
    (b) scanning a power supply noise generation pattern into said scan chain;
    (c) applying power to at least one functional circuit of said one or more said functional circuits and after said time delay applying a control signal to said least one power supply noise monitor of said one or more power supply noise monitors;

(d) scanning a resultant pattern out of said scan chain;
(e) setting said time delay to a predetermined value and repeating steps (b) through (d) a first predetermined number of times, each time increasing said time delay; and
(f) repeating steps (a) through (e) a second predetermined number of times, each time changing said reference voltage.

14. The method of claim 1, wherein said scan chain comprises a first scan chain containing only said functional circuits and a second scan chain containing only said power supply noise monitors and said power supply noise generation pattern includes a first power supply noise generation pattern and a second power supply noise generation pattern, said first power supply noise generation pattern scanned only into said first scan chain and said second power supply noise generation pattern scanned only into said second scan chain.

15. The method of claim 1, wherein, said scan chain comprises scan cells connected in series, an output of a previous scan cell connected to an input of a subsequent scan cell.

16. The method of claim 1, wherein said noise generation pattern causing said functional circuits to draw or not draw power from said power supply.

17. A method, comprising:
setting a time delay and setting a reference voltage;
(a) applying said reference voltage to a power supply noise monitor directly connected between a power supply and a scan cell of a scan chain of an integrated circuit, said integrated circuit containing a functional circuit connected to said power supply and said scan chain;
(b) scanning a power supply noise generation pattern into said scan chain;
(c) applying power to said functional circuit and after said time delay applying a control signal to said power supply noise monitor;
(d) scanning a resultant pattern out of said scan chain;
(e) repeating steps (b) through (d) a first predetermined number of times, each time increasing a value of said time delay; and
(f) repeating steps (a) through (e) a second predetermined number of times, each time changing said reference voltage.

18. The method of claim 17, further including:
converting said resultant data into a voltage versus time waveform of a power signal on said power supply and displaying said waveform on a computer screen or storing data describing said waveform on a computer storage medium or both displaying said waveform on a computer screen or storing data describing said waveform on a computer storage medium.

19. The method of claim 17, further including:
before (a) setting said time delay to zero; and
between (e) and (f) setting said time delay to zero.

20. The method of claim 17 wherein in (f), the value of the reference voltage is increased.

21. The method of claim 17, wherein in (f), the value of the reference voltage is decreased.

22. The method of claim 17, where (c) includes comparing a current value of said reference voltage to a voltage level on said power supply and generating a logical one or zero based on said comparing.

23. The method of claim 17, further including:
repeating (a) through (f) at different frequencies of a power signal applied to said power supply.

24. The method of claim 17, further including:
repeating (a) through (f) while said integrated circuit is at different temperatures.

25. The method of claim 17, wherein said scan chain comprises a first scan chain containing only said functional circuits and a second scan chain containing only said power supply noise monitors and said power supply noise generation pattern includes a first power supply noise generation pattern and a second power supply noise generation pattern, said first power supply noise generation pattern scanned only into said first scan chain and said second power supply noise generation pattern scanned only into said second scan chain.

26. The method of claim 17, wherein, said scan chain comprises scan cells connected in series, an output of a previous scan cell connected to an input of a subsequent scan cell.

27. The method of claim 17, wherein said noise generation pattern causing said functional circuits to draw or not draw power from said power supply.

28. An integrated circuit, comprising:
a scan chain comprising scan cells connected in series, said scan cells connected in series, an output of a previous scan cell connected to an input of a subsequent scan cell;
power supply noise monitor circuits directly connected between a power supply and respective scan cells of a first set of scan cells of said scan chain; and
functional circuits connected between respective scan cells of a second set of said scan cells-of said scan chain and respective scan cells of a third set of scan cell of said scan chain, said scan cells of said first set of scan cells different from scan cells of said second set of scan cells and scan cells of said third set of scan cells.

29. The integrated circuit of claim 28, wherein said power supply noise monitor circuits individually comprise a differential amplifier and a latch, a first input of said differential amplifier connected to said power supply, a second input of said differential amplifier connected to a reference voltage source, an output of said differential amplifier connected to a first input of said latch and an output of said latch connected to an input of a respective scan cell of said scan chain, and a control signal connected to a second input of said latch.

30. The integrated circuit of claim 28, wherein said power supply noise monitor circuits individually comprise a programmable low-pass filter, a differential amplifier and a latch, an input of said programmable low-pass filter connected to said power supply, an output of said programmable low-pass filter connected to a first input of said differential amplifier, a second input of said differential amplifier connected to a reference voltage source, an output of said differential amplifier connected to a first input of said latch and an output of said latch connected to an input of a respective scan cell of said scan chain, and a control signal connected to a second input of said latch.

31. The integrated circuit of claim 28;
wherein each of said scan cells are L1/L2 latches having first and second inputs and an output; and
wherein an output of a previous L1/L2 latch is connected to a first input of a subsequent L1/L2 latch, outputs of a first set of said L1/L2 latches are connected to inputs of respective functional circuits, second inputs of a second set of said L1/L2 latches are connected to outputs of respective functional circuits, and second inputs of a third set of said L1/L2 latches are connected to respective outputs of said power supply noise monitors, and each L1/L2 latch of said first, second and third sets of L1/L2 latches being different latches.

32. The integrated circuit of claim 28:
wherein each of said scan cells include a de-multiplexer having first and second inputs and a master/slave (M/S)

latch having an input and an output, and in each scan cell the output of the de-multiplexer is connected to the input of the M/S latch; and an output of a M/S latch of a previous scan cell is connected to a first input of the de-multiplexer of a subsequent scan cell, outputs of M/S latches a first set of scan cells are connected to inputs of respective functional circuits, second inputs of the de-multiplexers of a second set of said scan cells are connected to outputs of respective functional circuits, and second inputs of the de-multiplexers of a third set of said scan cells are connected to respective outputs of said power supply noise monitors, and each scan cell of said first, second and third sets of scan cells being different scan cells.

33. The integrated circuit of claim 28, wherein said scan chain comprises a first scan chain containing only said functional circuits and a second scan chain containing only said power supply noise monitors.

\* \* \* \* \*